(12) United States Patent
Liang et al.

(10) Patent No.: US 10,956,785 B2
(45) Date of Patent: Mar. 23, 2021

(54) METHODS, SYSTEMS, AND MEDIA FOR SELECTING CANDIDATES FOR ANNOTATION FOR USE IN TRAINING CLASSIFIERS

(71) Applicant: ARIZONA BOARD OF REGENTS ON BEHALF OF ARIZONA STATE UNIVERSITY, Scottsdale, AZ (US)

(72) Inventors: Jianming Liang, Scottsdale, AZ (US); Zongwei Zhou, Tempe, AZ (US); Jae Shin, Phoenix, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 56 days.

(21) Appl. No.: 16/397,990

(22) Filed: Apr. 29, 2019

(65) Prior Publication Data

US 2019/0332896 A1   Oct. 31, 2019

Related U.S. Application Data

(60) Provisional application No. 62/840,239, filed on Apr. 29, 2019, provisional application No. 62/663,931, filed on Apr. 27, 2018.

(51) Int. Cl.
  *G06K 9/00*   (2006.01)
  *G06K 9/62*   (2006.01)

(52) U.S. Cl.
  CPC ......... *G06K 9/6257* (2013.01); *G06K 9/6262* (2013.01)

(58) Field of Classification Search
  CPC .. G06K 9/6257; G06K 9/6262; G06K 9/6263; G06K 9/6254; G06K 9/6267;

(Continued)

(56) References Cited

U.S. PATENT DOCUMENTS 9,152,926 B2   10/2015   Liang et al.
9,330,336 B2   5/2016   Tajbakhsh et al.
(Continued)

FOREIGN PATENT DOCUMENTS

WO   2012109670 A1   8/2012
WO   2012109676 A1   8/2012
(Continued)

OTHER PUBLICATIONS

Settles, B., "Active Learning Literature Survey", Computer Sciences Technical Report: University of Wisconsin-Madison, 2010, vol. 52, No. 55-56, 67 pages.

(Continued)

*Primary Examiner* — Jose L Couso
(74) *Attorney, Agent, or Firm* — Elliott, Ostrander & Preston, P.C.

(57) ABSTRACT

Methods, systems, and media for selecting candidates for annotation for use in training classifiers are provided. In some embodiments, the method comprises: identifying, for a trained Convolutional Neural Network (CNN), a group of candidate training samples, wherein each candidate training sample includes a plurality of patches; for each patch of the plurality of patches, determining a plurality of probabilities, each probability being a probability that the patch corresponds to a label of a plurality of labels; identifying a subset of the patches in the plurality of patches; for each patch in the subset of the patches, calculating a metric that indicates a variance of the probabilities assigned to each patch; selecting a subset of the candidate training samples based on the metric; labeling candidate training samples in the subset of the candidate training samples by querying an external source; and re-training the CNN using the labeled candidate training samples.

15 Claims, 6 Drawing Sheets

(58) Field of Classification Search
CPC .. G06K 9/6231; G06K 9/6255; G06K 9/6259; G06K 9/6232; G06K 9/6278; G06K 9/6256; G06K 9/6298; G06K 9/6297; G06K 9/627; G06K 9/628; G06K 9/4628; G06K 9/0014; G06K 9/00147; G06N 3/0454; G06N 3/04; G06N 3/08–088; G06N 3/02; G06N 5/00; G06N 5/04; G06N 7/00; G06N 7/005; G06N 20/00; G06N 20/10; G06N 20/20; G06T 7/001; G06T 7/11; G06T 2200/28; G06T 2207/20081; G06T 2207/20084; G06T 2207/20076

See application file for complete search history.

(56) References Cited

U.S. PATENT DOCUMENTS

| | | | |
|---|---|---|---|
| 9,449,381 | B2 | 9/2016 | Liang |
| 9,603,554 | B2 | 3/2017 | Liang et al. |
| 9,684,957 | B2 | 6/2017 | Wu et al. |
| 9,700,213 | B2 | 7/2017 | Tajbakhsh et al. |
| 9,741,116 | B2 | 8/2017 | Liang et al. |
| 9,747,687 | B2 | 8/2017 | Tajbakhsh et al. |
| 9,924,927 | B2 | 3/2018 | Shin et al. |
| 9,959,615 | B2 | 5/2018 | Liang et al. |
| 9,978,142 | B2 | 5/2018 | Chi et al. |
| 10,052,027 | B2 | 8/2018 | Tajbakhsh et al. |
| 10,055,843 | B2 | 8/2018 | Tajbakhsh et al. |
| 10,120,980 | B2 | 11/2018 | Liang |
| 10,157,045 | B2 | 12/2018 | Venkataramani et al. |
| 10,157,467 | B2 | 12/2018 | Dincer et al. |
| 10,328,282 | B2 | 6/2019 | An et al. |
| 10,610,203 | B2 | 4/2020 | Liang et al. |
| 10,861,151 | B2 | 12/2020 | Liang et al. |
| 2008/0082468 | A1* | 4/2008 | Long ............... G06K 9/6256 706/12 |
| 2014/0135627 | A1 | 5/2014 | Liang et al. |
| 2017/0083792 | A1* | 3/2017 | Rodriguez-Serrano ............... G06T 7/10 |
| 2017/0099200 | A1* | 4/2017 | Ellenbogen ............ H04L 43/08 |
| 2017/0124701 | A1 | 5/2017 | Liang et al. |
| 2017/0337682 | A1 | 11/2017 | Liao et al. |
| 2018/0144241 | A1* | 5/2018 | Liu .................. G06N 3/08 |
| 2018/0144243 | A1* | 5/2018 | Hsieh ............... G06N 3/0454 |
| 2018/0189229 | A1 | 7/2018 | Desoli et al. |
| 2018/0225820 | A1 | 8/2018 | Liang et al. |
| 2018/0225823 | A1 | 8/2018 | Zhou et al. |
| 2018/0253866 | A1 | 9/2018 | Jain et al. |
| 2018/0260957 | A1 | 9/2018 | Yang et al. |
| 2018/0293496 | A1* | 10/2018 | Vogels ............... G06T 5/002 |
| 2018/0293734 | A1 | 10/2018 | Lim et al. |
| 2018/0307947 | A1 | 10/2018 | Choi et al. |
| 2018/0314943 | A1 | 11/2018 | Liang et al. |
| 2019/0021677 | A1 | 1/2019 | Grbic et al. |
| 2019/0065908 | A1* | 2/2019 | Lee .................. G06K 9/4604 |
| 2019/0130110 | A1* | 5/2019 | Lee .................. G06N 5/041 |
| 2019/0223738 | A1* | 7/2019 | Boscke ............. A61B 5/14552 |
| 2019/0244348 | A1* | 8/2019 | Buckler ............... G06T 7/11 |
| 2019/0325621 | A1* | 10/2019 | Wang ................ A61B 6/037 |
| 2020/0074271 | A1 | 3/2020 | Liang et al. |
| 2020/0074701 | A1 | 3/2020 | Liang et al. |
| 2020/0134461 | A1* | 4/2020 | Chai ................. G06N 3/04 |
| 2020/0175352 | A1* | 6/2020 | Cha ................. G06T 7/0004 |
| 2020/0272864 | A1* | 8/2020 | Faust ............... G06K 9/3233 |
| 2020/0327162 | A1* | 10/2020 | Pevtsov ............ G06F 16/9536 |
| 2020/0364477 | A1 | 11/2020 | Siddiquee et al. |
| 2020/0380695 | A1 | 12/2020 | Zhou et al. |

FOREIGN PATENT DOCUMENTS

| | | |
|---|---|---|
| WO | 2013116865 A1 | 8/2013 |
| WO | 2013116867 A1 | 8/2013 |
| WO | 2015031641 A1 | 3/2015 |
| WO | 2015113014 A1 | 7/2015 |
| WO | 2015142808 A1 | 9/2015 |
| WO | 2015164724 A1 | 10/2015 |
| WO | 2015164768 A1 | 10/2015 |
| WO | 2016161115 A1 | 10/2016 |
| WO | 2017027475 A1 | 2/2017 |
| WO | 2018232388 A1 | 12/2018 |
| WO | 2019019199 A1 | 1/2019 |

OTHER PUBLICATIONS

Shannon, C., "A Mathematical Theory of Communication", The Bell System Technical Journal, Oct. 1948, vol. 27, No. 3, pp. 379-423.

Shelhamer, E. et al., "Fully Convolutional Networks for Semantic Segmentation", IEEE Transactions on Pattern Analysis and Machine Intelligence, Apr. 2017 (Date of Publication: May 24, 2016), vol. 39, No. 4, pp. 640-651 <DOI:10.1109/TPAMI.2016.2572683>.

Shin, H-C. et al., "Deep Convolutional Neural Networks for Computer-Aided Detection: CNN Architectures, Dataset Characteristics and Transfer Learning", IEEE Transactions on Medical Imaging, May 2016 (date of publication Feb. 2016), vol. 35, No. 5, pp. 1285-1298 <DOI:10.1109/TMI.2016.2528162>.

Shin, H-C. et al., "Interleaved text/image Deep Mining on a large-scale radiology database", IEEE Conference on Computer Vision and Pattern Recognition (Boston, MA, Jun. 7-12, 2015), 2015, pp. 1090-1099 <DOI:10.1109/CVPR.2015.7298712>.

Shin, J. et al., "Automating Carotid Intima-Media Thickness Video Interpretation with Convolutional Neural Networks", IEEE Conference on Computer Vision and Pattern Recognition (Las Vegas, NV, Jun. 27-30, 2016), 2016 (date added to IEEE Xplore Dec. 2016), pp. 2526-2535 <DOI:10.1109/CVPR.2016.277>.

Simonyan, K. et al., "Very deep convolutional networks for large-scale image recognition", arXiv, Published as a conference paper at ICLR 2015, 2014, 14 pages.

Stark, F. et al., "CAPTCHA recognition with active deep learning", Citeseer, Sep. 2015, 8 pages.

Stein, J. et al., "Use of Carotid Ultrasound to Identify Subclinical Vascular Disease and Evaluate Cardiovascular Disease Risk: A Consensus Statement from the American Society of Echocardiography Carotid Intima-Media Thickness Task Force Endorsed by the Society for Vascular Medicine", Journal of the American Society of Echocardiography, 2008, vol. 21, No. 2, pp. 93-111 <DOI:10.1016/j.echo.2007.11.011>.

Szegedy, C. et al., "Going deeper with convolutions", IEEE Conference on Computer Vision and Pattern Recognition (Boston, MA, Jun. 7-12, 2015), Date Added to IEEE Xplore: Oct. 2015 <DOI:10.1109/CVPR.2015.7298594>.

Tajbakhsh, N. et al., "Chapter 5—Automatic Interpretation of Carotid Intima—Media Thickness Videos Using Convolutional Neural Networks", Deep Learning for Medical Image Analysis, Jan. 2017, pp. 105-131 <DOI:10.1016/B978-0-12-810408-8.00007-9>.

Tajbakhsh, N. et al., "Computer-aided pulmonary embolism detection using a novel vessel-aligned multi-planar image representation and convolutional neural networks", International Conference on Medical Image Computing and Computer-Assisted Intervention, Springer, 2015, pp. 62-69 <DOI:10.1007/978-3-319-24571-3_8>.

Tajbakhsh, N. et al., "Convolutional neural networks for medical image analysis: Full training or fine tuning?", May 2016 (Date of Publication: Mar. 7, 2016), vol. 35, No. 5, pp. 1299-1312 <DOI:10.1109/TMI.2016.2535302>.

Van Rijn, J. et al., "Polyp miss rate determined by tandem colonoscopy: a systematic review", American Journal of Gastroenterology, 2006, vol. 101, No. 2, pp. 343-350 <DOI:10.1111/j.1572-0241.2006.00390.x>.

Wang, D. et al., "A new active labeling method for deep learning", International Joint Conference on Neural Networks (Beijing, China, Jul. 6-11, 2014), 2014, pp. 112-119 <DOI:10.1109/IJCNN.2014.6889457>.

Wang, H. et al., "Comparison of machine learning methods for classifying mediastinal lymph node metastasis of non-small cell

(56) References Cited

OTHER PUBLICATIONS lung cancer from 18F-FDG PET/CT images", EJNMMI Research, Jan. 2017, vol. 7, No. 11, 11 pages <DOI:10.1186/s13550-017-0260-9>.

Weiss, K. et al., "A survey of transfer learning", Journal of Big Data, May 2016, vol. 3, No. 9, 40 pages <DOI:10.1186/s40537-016-0043-6>.

World Health Organization (WHO)., "Global Atlas on Cardiovascular Disease Prevention and Control", Sep. 2011, 166 pages, available online <URL:https://www.who.int/cardiovascular_diseases/publications/atlas_cvd/en/>.

Yang, L. et al., "Suggestive annotation: A deep active learning framework for biomedical image segmentation", arXiv, Jun. 2017, pp. 399-407.

Yuan, X-T. et al., "Truncated power method for sparse eigenvalue problems", The Journal of Machine Learning Research, Jan. 2013, vol. 14, No. 1, pp. 899-925.

Zhang, J. et al., "Transfer Learning for Cross-Dataset Recognition: A Survey", Jul. 2017, accessed from: https://arxiv.org/abs/1705.04396.

Zhou, B. et al., "Places: A 10 million image database for scene recognition", IEEE Transactions on Pattern Analysis and Machine Intelligence, Jul. 2017, vol. 40, No. 6, pp. 1452-1464 <DOI:10.1109/TPAMI.2017.2723009>.

Zhou, B. et al., "Places: An Image Database for Deep Scene Understanding", arXiv preprint, Oct. 2016, 12 pages, accessed from: arXiv:1610.02055.

Zhou, Z. et al., "AFT*: Integrating Active Learning and Transfer Learning to Reduce Annotation Efforts", arXiv:1802.00912, Nov. 2018, 14 pages.

Zhou, Z. et al., "Fine-Tuning Convolutional Neural Networks for Biomedical Image Analysis: Actively and Incrementally", IEEE Conference on Computer Vision and Pattern Recognition (Honolulu, HI, Jul. 21-26, 2017), 2017 (Date Added to IEEE Xplore: Nov. 9, 2017), pp. 4761-4772 <DOI:10.1109/CVPR.2017.506>.

Zhou, Z. et al., "Integrating Active Learning and Transfer Learning for Carotid Intima-Media Thickness Video Interpretation", Journal of Digital Imaging, 2019 (available online Nov. 2018), vol. 32, pp. 290-299 <DOI:10.1007/s10278-018-0143-2>.

Huang, S., "Cost-Effective Training of Deep CNNs with Active Model Adaptation", in: Proceedings of the 24th ACM SIGKDD International Conference on Knowledge Discovery & Data Mining, ACM. Aug. 10-23, 2018, pp. 1580-1588.

Lin, L., "Active Self-Paced Learning for Cost-Effective and Progressive Face Identification", IEEE Transactions on Pattern Analysis and Machine Intelligence 40, Jan. 7-19, 2018, pp. 1-13.

U.S. Appl. No. 15/965,691, dated Apr. 27, 2018.

Al Rahhal, M. et al., "Deep learning approach for active classification of electrocardiogram signals", Information Sciences, Jun. 2016, vol. 345, pp. 340-354 <DOI:10.1016/j.ins.2016.01.082>.

Borisov, A. et al., "Active Batch Learning with Stochastic Query-by-Forest (SQBF)", JMLR: Workshop and Conference Proceedings, 2010 (published 2011), vol. 16, pp. 59-69.

Calder, K. et al., "The mortality of untreated pulmonary embolism in emergency department patients", Annals of Emergency Medicine, Mar. 2005, vol. 45, No. 3, pp. 302-310 <DOI:10.1016/j.annemergmed.2004.10.001>.

Carneiro, G. et al., "Unregistered multiview mammogram analysis with pre-trained deep learning models", Medical Image Computing and Computer-Assisted Intervention—MICCAI (Munich, Germany, Oct. 5-9, 2015), 2015, vol. 9351, pp. 652-660 <DOI:10.1007/978-3-319-24574-4 78>.

Chakraborty, S. et al., "Active Batch Selection via Convex Relaxations with Guaranteed Solution Bounds", IEEE Transactions on Pattern Analysis and Machine Intelligence, Oct. 2015 (Date of Publication: Jan. 12, 2015), vol. 37, No. 10, pp. 1945-1958 <DOI:10.1109/TPAMI.2015.2389848>.

Chattopadhyay, R. et al., "Joint transfer and batch-mode active learning", International Conference on Machine Learning (Atlanta, GA, Jun. 16-21, 2013), 2013, pp. 253-261.

Chen, H. et al., "Automatic fetal ultrasound standard plane detection using knowledge transferred recurrent neural networks", Medical Image Computing and Computer-Assisted Intervention—MICCAI (Munich, Germany, Oct. 5-9, 2015), 2015, pp. 507-514.

Chen, H. et al., "Standard plane localization in fetal ultrasound via domain transferred deep neural networks", IEEE Journal of Biomedical and Health Informatics, Sep. 2015 (Date of Publication: Apr. 21, 2015), vol. 19, No. 5, pp. 1627-1636 <DOI:10.1109/JBHI.2015.2425041>.

D'Agostino, R. et al., "General Cardiovascular Risk Profile for use in Primary Care", Circulation, Feb. 2008 (available online Jan. 2008), vol. 117, No. 6, pp. 743-753 <DOI:10.1161/CIRCULATIONAHA.107.699579>.

Delsanto, S. et al., "Characterization of a Completely User-Independent Algorithm for Carotid Artery Segmentation in 2-D Ultrasound Images", IEEE Transactions on Instrumentation and Measurement, Aug. 2007 (date of publication Jul. 2007), vol. 56, No. 4, pp. 1265-1274 <DOI:10.1109/TIM.2007.900433>.

Deng, J. et al., "Imagenet: A large-scale hierarchical image database", IEEE Conference on Computer Vision and Pattern Recognition (Miami, FL, Jun. 20-25, 2009), 2009, pp. 248-255 <DOI:10.1109/CVPR.2009.5206848>.

Feige, U., "A Threshold of in n for Approximating Set Cover", Journal of the ACM, Jul. 1998, vol. 45, No. 4, pp. 634-652 <DOI:10.1145/285055.285059>.

Gao, M. et al., "Holistic classification of ct attenuation patterns for interstitial lung diseases via deep convolutional neural networks", Computer Methods in Biomechamics and Biomedical Engineering. Imaging & Visualization, 2015 (available online Jun. 2016), vol. 6, No. 1, pp. 1-6 <DOI:10.1080/21681163.2015.1124249>.

Gepner, A. et al., "Comparison of Coronary Artery Calcium Presence, Carotid Plaque Presence, and Carotid Intima-Media Thickness for Cardiovascular Disease Prediction in the Multi-Ethnic Study of Atherosclerosis", Circulation, Jan. 2015, vol. 8, No. 1, pp. 1-8 <DOI:10.1161/CIRCIMAGING.114.002262>.

Greenspan, H. et al., "Guest Editorial Deep Learning in Medical Imaging: Overview and Future Promise of an Exciting New Technique", May 2016 (Date of Publication: Apr. 29, 2016), vol. 35, No. 5, pp. 1153-1159 <DOI:10.1109/TMI.2016.2553401>.

Gunn, S. et al., "Support Vector Machines for Classification and Regression", ISIS Technical Report, May 1998, vol. 14, pp. 85-86.

Guyon, I. et al., "Results of the Active Learning Challenge", JMLR: Workshoup and Conference Proceedings, 2011, vol. 16, pp. 19-45.

He, K. et al., "Deep Residual Learning for Image Recognition", IEEE Conference on Computer Vision and Pattern Recognition, Jun. 2016, pp. 770-778 <DOI.1109/CVPR.2016.90>.

Heresbach, D. et al., "Miss rate for colorectal neoplastic polyps: a prospective multicenter study of back-to-back video colonoscopies", Endoscopy, Apr. 2008, vol. 40, No. 4, pp. 284-290 <DOI:10.1055/s-2007-995618>.

Huang, G. et al., "Densely connected convolutional networks", arXiv preprint, 2016, 9 pages, <accessed from: arXiV:1608.06993>.

Huang, S-J. et al., "Active learning by querying informative and representative examples", International Conference on Neural Information Processing (Vancouver, Canada, Dec. 6-9, 2010), 2010, vol. 1, pp. 9 pages.

Hurst, T. et al., "Incidence of Subclinical Atherosclerosis as a Marker of Cardiovascular Risk in Retired Professional Football Players", The American Journal of Cardiology, Apr. 2010 (available online Feb. 2010), vol. 105, No. 8, pp. 1107-1111 <DOI:10.1016/j.amjcard.2009.12.012>.

Jia, Y. et al., "Caffe: Convolutional Architecture for Fast Feature Embedding", arXiv preprint, 2014, 4 pages, accessed from: arXiv:1408.5093.

Kass, M. et al., "Snakes: Active Contour Models", International Journal of Computer Vision, 1988, vol. 1, No. 4, pp. 321-331.

Kim, D. et al., "CT Colonography versus Colonoscopy for the Detection of Advanced Neoplasia", The New England Journal of Medicine, Oct. 2007, vol. 357, No. 14, pp. 1403-1412 <DOI:10.1056/NEJMoa070543>.

Konyushkova, K. et al., "Learning Active Learning from Data", Advances in Neural Information Processing Systems, Dec. 2017, pp. 4226-4236.

(56) References Cited

OTHER PUBLICATIONS

Krizhevsky, A. et al., "ImageNet Classification with Deep Convolutional Neural Networks", Advances in Neural Information Processing Systems, 2012, pp. 1097-1105.

Kukar, M. et al., "Transductive reliability estimation for medical diagnosis", Artificial Intelligence in Medicine, Sep.-Oct. 2003, vol. 29, No. 1-2, pp. 81-106 <DOI:10.1016/S0933-3657(03)00043-5>.

Lecun, Y. et al., "Deep learning", Nature, May 2015, vol. 521, No. 7553, pp. 436-444 <DOI:10.1038/nature14539>.

Lecun, Y. et al., "Gradient-based learning applied to document recognition", Proceedings of the IEEE, Nov. 1998, vol. 86, No. 11, pp. 2278-2324 <DOI:10.1109/5.726791>.

Leufkens, A. et al., "Factors influencing the miss rate of polyps in a back-to-back colonoscopy study", Endoscopy, May 2012, vol. 44, No. 5, pp. 470-475 <DOI:10.1055/s-0031-1291666>.

Li, J., "Active learning for hyperspectral image classification with a stacked autoencoders based neural network", IEEE International Conference on Image Processing (Phoenix, AZ, Sep. 25-28, 2016), 2016, pp. 1062-1065 <DOI:10.1109/ICIP.2016.7532520>.

Li, M. et al., "Confidence-based active learning", IEEE Transactions on Pattern Analysis and Machine Intelligence, Aug. 2006 (Date of Publication: Jun. 19, 2006), vol. 28, No. 8, pp. 1251-1261 <DOI:10.1109/TPAMI.2006.156>.

Liang, J. et al., "Computer aided detection of pulmonary embolism with tobogganing and mutiple instance classification in CT pulmonary angiography", International Conference of Information Processing in Medical Imaging (Kerkrade, Netherlands, Jul. 2007), 2007, pp. 630-641.

Liang, J. et al., "United Snakes", Medical Image Analysis, Apr. 2006 (available online Nov. 2005), vol. 10, No. 2, pp. 215-233 <DOI:10.1016/j.media.2005.09.002>.

Liang, Q. et al., "A multiscale dynamic programming procedure for boundary detection in ultrasonic artery images", IEEE Transactions on Medical Imaging, Feb. 2000, vol. 19, No. 2, pp. 127-142 <DOI:10.1109/42.836372>.

Litjens, G. et al., "A survey on deep learning in medical image analysis", Medical Image Analysis, Dec. 2017, vol. 42, pp. 60-88 <DOI:10.1016/j.media.2017.07.005>.

Loizou, C. et al., "An integrated system for the segmentation of atherosclerotic carotid plaque", IEEE Transactions on Information Technology in Biomedicine, Nov. 2007, vol. 11, No. 6, pp. 661-667 <DOI:10.1109/TITB.2006.890019>.

Long, J. et al., "Fully Convolutional Networks for Semantic Segmentation", IEEE Conference on Computer Vision and Pattern Recognition, 2015, pp. 3431-3440.

Lorenz, M. et al., "Prediction of Clinical Cardiovascular Events With Carotid Intima-Media Thickness", Circulation, Jan. 2007, vol. 115, No. 4, pp. 459-467 <DOI:10.1161/CIRCULATIONAHA.106.628875>.

Margeta, J. et al., "Fine-tuned convolutional neural nets for cardiac mri acquisition plane recognition", Computer Methods in Biomechamics and Biomedical Engineering. Imaging & Visualization, Aug. 2015, pp. 1-11 <DOI:10.1080/21681163.2015.1061448>.

Menchon-Lara, R-M. et al., Automatic Evaluation of Carotid Intima-Media Thickness in Ultrasounds Using Machine Learning, International Work-Conference on the Interplay Between Natural and Artitical Computation, 2013, vol. 7931, pp. 241-249 <DOI:10.1007/978-3-642-38622-0_25>.

Menchon-Lara, R-M. et al., "Fully automatic segmentation of ultrasound common carotid artery images based on machine learning", Neurocomputing, Mar. 2015 (available online Oct. 2014), vol. 151, No. 1, pp. 161-167 <DOI:10.1016/j.neucom.2014.09.066>.

Mosinska, J. et al., "Active learning and proofreading for delineation of curvilinear structures", Medical Image Computing and Computer Assisted Intervention—MICCAI (Quebec City, Canada, Sep. 11-13, 2017), 2017, pp. 165-173.

Mozaffarian, D. et al., "Heart Disease and Stroke Statistics—2015 Update", Circulation, Jan. 2015 (available online Dec. 2014), vol. 131, No. 4, pp. e29-e322 <DOI:10.1161/CIR.0000000000000152>.

Pabby, A. et al., "Analysis of colorectal cancer occurrence during surveillance colonoscopy in the dietary Polyp Prevention Trial", Gastrointestinal Endoscopy, Mar. 2005, vol. 61, No. 3, pp. 385-391 <DOI:10.1016/S0016-5107(04)02765-8>.

Pan, S. et al., "A survey on transfer learning", IEEE Transactions on Knowledge and Data Engineering, Oct. 2010 (Date of Publication: Oct. 16, 2009), vol. 22, No. 10, pp. 1345-1359 <DOI:10.1109/TKDE.2009.191>.

Rabeneck, H. et al., "Outcomes of colorectal cancer in the united states: no change in survival (1986-1997).", The American Journal of Gastroenterology, Feb. 2003, vol. 98, No. 2, pp. 471-477 <DOI:10.1111/i.1572-0241.2003.07260.x>.

Sadigh, G. et al., "Challenges, controversies, and hot topics in pulmonary embolism imaging", American Journal of Roentgenology, Mar. 2011, vol. 196, No. 3, pp. 497-515 <DOI:10.2214/AJR.10.5830>.

Schlegl, J. et al., "Unsupervised pre-training across image domains improves lung tissue classification", Medical Computer Vision: Algorithms for Big Data International Workshop (Cambridge, MA, Sep. 18, 2014), 2014, pp. 82-93.

Liu, B., "Active learning for human pose estimation", in: Proceedings of the IEEE International Conference on Computer Vision, Oct. 22-29, 2017, pp. 4363-4372.

Xie, S., "Aggregated residual transformations for deep neural networks", in: Proceedings of the IEEE conference on computer vision and pattern recognition, pp. 5987-5995.

Alex, V., et al., "Generative adversarial networks for brain lesion detection," in Medical Imaging 2017: Image Processing, vol. 10133, p. 101330G, International Society for Optics and Photonics, 2017.

Anders, C. et al., "Understanding Patch-Based Learning by Explaining Predictions", arXiv.org, submitted Jun. 2018, 7 pages, arXiv:1806.06926v1.

Arjovsky, M., et al., "Wasserstein generative adversarial networks," in International Conference on Machine Learning, pp. 214-223, 2017.

Bai, W., et al., "Semi-supervised learning for network-based cardiac mr image segmentation," in International conference on Medical Image Computing and Computer-Assisted Intervention, pp. 253-260. Springer, 2017.

Baumgartner, C.F., et al., "Visual feature attribution using wasserstein gans," in Proc IEEE Comput Soc Conf Comput Vis Pattern Recognit, 2017, 11 pages.

Cai, J., et al., "Iterative attention mining for weakly supervised thoracic disease pattern localization in chest x-rays," in International Conference on Medical Image Computing and Computer-Assisted Intervention, pp. 589-598. Springer, 2018.

Chang, H., et al., "Pairedcyclegan: Asymmetric style transfer for applying and removing makeup," in 2018 IEEE Conference on Computer Vision and Pattern Recognition (CVPR), 2018, 9 pages.

Chen, X., et al., "Unsupervised detection of lesions in brain mri using constrained adversarial autoencoders," arXiv preprint arXiv:1806.04972, 2018, 9 pages.

Choi, Y., et al., "Stargan: Unified generative adversarial networks for multidomain image-to-image translation," in The IEEE Conference on Computer Vision and Pattern Recognition (CVPR), Jun. 2018, 9 pages.

Goodfellow, I., et al., "Generative adversarial nets," in Advances in neural information processing systems, 2014, 9 pages.

Gulrajani, I., et al., "Improved training of wasserstein gans," in Advances in Neural Information Processing Systems, 2017, 11 pages.

Hwang, S., et al., "Self-transfer learning for weakly supervised lesion localization," in Medical Image Computing and Computer-Assisted Intervention—MICCAI 2016, pp. 239-246, Springer International Publishing.

Isola, P., et al., "Image-to-image translation with conditional adversarial networks," arXiv preprint arXiv:1611.07004, 2016, 16 pages.

Kim, T., et al., "Learning to discover cross-domain relations with generative adversarial networks," in International Conference on Machine Learning, 2017, 9 pages.

Kistler, M., et al., "The virtual skeleton database: An open access repository for biomedical research and collaboration," J Med Internet Res, 15(11):e245, Nov 2013, 14 pages.

(56) References Cited

OTHER PUBLICATIONS

Ledig, C., et al., "Photo-realistic single image super-resolution using a generative adversarial network," in CVPR, volume 2, page 4, 2017.
Li, Z., et al., "Thoracic disease identification and localization with limited supervision," in Proceedings of the IEEE Conference on Computer Vision and Pattern Recognition, pp. 8290-8299, 2018.
Liu, M.-Y., et al., "Unsupervised image-to-image translation networks," in Advances in Neural Information Processing Systems, 2017, 9 pages.
Liu, Z., et al., "Deep learning face attributes in the wild," in Proceedings of the IEEE International Conference on Computer Vision, pp. 3730-3738, 2015.
Menze, B. H., et al., "The multimodal brain tumor image segmentation benchmark (brats)," IEEE transactions on medical imaging, 34(10):1993, 2015, 32 pages.
Oquab, M., et al., "Is object localization for free?-weakly-supervised learning with convolutional neural networks," in Proceedings of the IEEE Conference on Computer Vision and Pattern Recognition, pp. 685-694, 2015.
Pinheiro, P. O., et aL, "From image-level to pixellevel labeling with convolutional networks," in Proceedings of the IEEE Conference on Computer Vision and Pattern Recognition, pp. 1713-1721, 2015.
Schlegl, T., et al., "f-anogan: Fast unsupervised anomaly detection with generative adversarial networks," Medical Image Analysis, 2019, 15 pages.
Selvaraju, R. R., et al., "Grad-cam: Visual explanations from deep networks via gradient-based localization," in Proceedings of the IEEE International Conference on Computer Vision, pp. 618-626, 2017.
Shin, S. Y., et al., "Joint weakly and semi-supervised deep learning for localization and classification of masses in breast ultrasound images," IEEE transactions on medical imaging, 2018, 13 pages.
Simonyan, K., et al., "Deep inside convolutional networks: Visualising image classification models and saliency maps," arXiv preprint arXiv:1312.6034, 2013, 8 pages.
Singh, K. K., et aL, "Hide-and-seek: Forcing a network to be meticulous for weakly-supervised object and action localization," in 2017 IEEE International Conference on Computer Vision (ICCV), pp. 3544-3553, IEEE, 2017.
Tang, Y., et al., "Attention-guided curriculum learning for weakly supervised classification and localization of thoracic diseases on chest radiographs," in International Workshop on Machine Learning in Medical Imaging, Springer, 2018, 9 pages.
U.S. Appl. No. 17/098,422, filed Nov. 15, 2020, Hosseinzadeh Taher et al.
Wang, K, et al., "Cost-effective active learning for deep image classification" (2017), IEEE Transactions on Circuits and Systems for Video Technology 27, pp. 2591-2600.
Wang, X., et al., "Chestx-ray8: Hospital-scale chest x-ray database and benchmarks on weakly-supervised classification and localization of common thorax diseases," in Proceedings of the IEEE Conference on Computer Vision and Pattern Recognition, 2017, 10 pages.
Wolterink, J. M., et al., "Deep mr to ct synthesis using unpaired data," in International Workshop on Simulation and Synthesis in Medical Imaging, pp. 14-23, Springer, 2017.
Yi, Z., "Dualgan: Unsupervised dual learning for image-to-image translation," in ICCV, pp. 2868-2876, 2017.
Zhang, X., "Adversarial complementary learning for weakly supervised object localization," in Proceedings of the IEEE Conference on Computer Vision and Pattern Recognition, pp. 1325-1334, 2018.
Zhou, B., et al., "Learning deep features for discriminative localization," in Proceedings of the IEEE Conference Computer Vision and Pattern Recognition, pp. 2921-2929, 2016.
Zhu J.-Y. et al., "Toward multimodal image-to-image translation," in Advances in Neural Information Processing Systems, 2017, 12 pages.
Zhu, J.-Y., et al., "Unpaired image-to-image translation using cycle-consistent adversarial networks," arXiv preprint, 2017, 20 pages.

\* cited by examiner

Algorithm 1: AFT* – Active, continuous fine-tuning

Input:
$\mathcal{U} = \{C_i\}, i \in [1, n]$ {unlabeled pool $\mathcal{U}$ contains $n$ candidates}
$C_i = \{x_i^j\}, j \in [1, m]$ {$C_i$ has $m$ patches}
$\mathcal{M}_0$: pre-trained CNN; $\alpha$: majority selection ratio; $b$: batch size; $\mathcal{Y}$: category set

Output: $\mathcal{L}$: labeled candidates; $\mathcal{M}_T$: fine-tuned CNN model at Step $T$ 1  $\mathcal{L} \leftarrow \emptyset$; $T \leftarrow 1$
2  repeat
3      for each $C_i \in \mathcal{U}$ do
4          $P_i \leftarrow \mathcal{M}_{T-1}(C_i)$ {outputs of $\mathcal{M}_{T-1}$ given $\forall x \in C_i$}
5          $C_i' \leftarrow C_i$ sorted in a descending order according to the predicted dominant class $\hat{y} \leftarrow \text{argmax}_{y \in \mathcal{Y}} \sum P_i^y$
6          $C_i'' \leftarrow$ top $\alpha \times 100\%$ of the patches of the sorted list $C_i'$
7          Compute $A_i$ for $C_i''$ (Eq. 2)
8      end
9      Sort $\mathcal{U}$ according to $\mathcal{A}$ in a descending order
10     Compute sampling probability $\mathcal{A}^s$ using sorted list $\mathcal{A}'$ (Eq. 4)
11     Associate labels for $b$ candidates with sampling probabilities: $\mathcal{Q} \leftarrow \mathcal{Q}(\mathcal{A}^s, b)$
12     $P_i \leftarrow \mathcal{M}_{T-1}(C_i)$ {outputs of $\mathcal{M}_{T-1}$ given $\forall x \in C_i$}
13     Select misclassified candidates from $\mathcal{L}$ based on their annotation: $\mathcal{H} \leftarrow \mathcal{J}(P, \mathcal{L})$
14     Fine-tune $\mathcal{M}_{T-1}$ with $\mathcal{H} \cup \mathcal{Q}$: $\mathcal{M}_T \leftarrow F(\mathcal{H} \cup \mathcal{Q}, \mathcal{M}_{T-1})$
15     $\mathcal{L} \leftarrow \mathcal{L} \cup \mathcal{Q}$; $\mathcal{U} \leftarrow \mathcal{U} \setminus \mathcal{Q}$; $T \leftarrow T + 1$
16 until classification performance is satisfied;

| pattern | A | B | C | D | E | F | G |
|---|---|---|---|---|---|---|---|
| Example | 0.4 0.5 | 0.0 0.6 | 0.0 0.9 | 0.0 0.0 | 0.9 1.0 | 0.0 0.2 | 0.0 0.9 |
| | 0.4 0.5 | 0.1 0.7 | 0.0 1.0 | 0.0 0.1 | 0.9 1.0 | 0.0 0.2 | 0.1 0.9 |
| | 0.4 0.5 | 0.2 0.8 | 0.0 1.0 | 0.0 0.1 | 0.9 1.0 | 0.0 0.3 | 0.7 1.0 |
| | 0.5 0.6 | 0.3 1.0 | 0.1 1.0 | 0.0 0.1 | 0.9 1.0 | 0.1 0.9 | 0.8 1.0 |
| | 0.5 0.6 | 0.4 1.0 | 0.1 1.0 | 0.0 0.1 | 1.0 1.0 | 0.1 1.0 | 0.8 1.0 |
| | 0.6 | 0.4 | 0.9 | 0.0 | 1.0 | 0.1 | 0.9 |
| entropy | 7.52 | 4.57 | 1.30 | 1.30 | 1.30 | 3.24 | 3.24 |
| entropy$^\alpha$ | 2.02 | 0.83 | 0.00 | 0.00 | 0.00 | 0.33 | 0.33 |
| diversity | 4.38 | 1237.21 | 2016.66 | 189.54 | 189.54 | 1076.87 | 1076.87 |
| diversity$^\alpha$ | 0.00 | 20.79 | 0.00 | 0.00 | 0.00 | 13.54 | 13.54 |

FIG. 6

METHODS, SYSTEMS, AND MEDIA FOR SELECTING CANDIDATES FOR ANNOTATION FOR USE IN TRAINING CLASSIFIERS

CROSS REFERENCE TO RELATED APPLICATIONS

This application claims the benefit of U.S. Provisional Patent Application No. 62/663,931, filed Apr. 27, 2018, and U.S. Provisional Patent Application No. 62/840,239, filed on Apr. 29, 2019, each of which is hereby incorporated by reference herein in its entirety.

STATEMENT REGARDING GOVERNMENT FUNDED RESEARCH

This invention was made with government support under R01_HL128785 awarded by the National Institutes of Health. The government has certain rights in the invention.

TECHNICAL FIELD

The disclosed subject matter relates to methods, systems, and media for selecting candidates for annotation for use in training classifiers.

BACKGROUND

Intense interest in applying classifiers (such as convolutional neural networks (CNNs)) in biomedical image analysis is widespread. For example, CNNs can be used to suggest to an authorized professional whether one or more biomedical images are likely to have one or more given characteristics (which can be represented by one or more of |Y| possible labels) so that the professional can diagnose a medical condition of a patient.

In order for a CNN to perform this function, the CNN needs to be trained using annotated biomedical training images that indicate whether the training images have one or more of the |Y| possible labels. For example, for the CNN to be able to spot a condition in an image, many training images annotated as showing the condition and many training images annotated as not showing the condition can be used to train the CNN. The better trained the CNN is, the less likely the CNN is to misclassify an image.

The success of CNNs for this purpose, however, is impeded by the lack of large annotated datasets in biomedical imaging. Annotating biomedical images is not only tedious and time consuming, but also demanding of costly, specialty-oriented knowledge and skills, which are not easily accessible.

Accordingly, it is desirable to provide new methods, systems, and media for selecting candidates for annotation for use in training classifiers.

SUMMARY

Methods, systems, and media for selecting candidates for annotation for use in training classifiers are provided. In accordance with some embodiments of the disclosed subject matter, a method for selecting candidates for annotation for use in training classifiers is provided, the method comprising: identifying, for a trained Convolutional Neural Network (CNN), a group of candidate training samples, wherein each candidate training sample is a portion of an image, and wherein each candidate training sample includes a plurality of patches of the portion of the image; for each candidate training sample in the group of candidate training samples: for each patch of the plurality of patches associated with the candidate training sample, determining a plurality of probabilities, each probability being a probability that the patch corresponds to a label of a plurality of labels, wherein the plurality of probabilities are determined using the trained CNN; identifying a subset of the patches in the plurality of patches; and for each patch in the subset of the patches, calculating a metric that indicates at least a variance of the probabilities assigned to each patch in the subset of the patches; selecting a subset of the candidate training samples from the group of candidate training samples based on the metric, wherein the subset does not include all of the candidate training samples; labeling candidate training samples in the subset of the candidate training samples by querying an external source; and re-training the CNN using the labeled candidate training samples.

In accordance with some embodiments of the disclosed subject matter, a system for selecting candidates for annotation for use in training classifiers is provided, the system comprising: a memory; and a hardware processor that, when executing computer-executable instructions stored in the memory, is configured to: identify, for a trained Convolutional Neural Network (CNN), a group of candidate training samples, wherein each candidate training sample is a portion of an image, and wherein each candidate training sample includes a plurality of patches of the portion of the image; for each candidate training sample in the group of candidate training samples: for each patch of the plurality of patches associated with the candidate training sample, determine a plurality of probabilities, each probability being a probability that the patch corresponds to a label of a plurality of labels, wherein the plurality of probabilities are determined using the trained CNN; identify a subset of the patches in the plurality of patches; and for each patch in the subset of the patches, calculate a metric that indicates at least a variance of the probabilities assigned to each patch in the subset of the patches; select a subset of the candidate training samples from the group of candidate training samples based on the metric, wherein the subset does not include all of the candidate training samples; label candidate training samples in the subset of the candidate training samples by querying an external source; and re-train the CNN using the labeled candidate training samples.

In accordance with some embodiments of the disclosed subject matter, non-transitory computer-readable media containing computer executable instructions that, when executed by a processor, cause the processor to perform a method for selecting candidates for annotation for use in training classifiers. The method comprises: identifying, for a trained Convolutional Neural Network (CNN), a group of candidate training samples, wherein each candidate training sample is a portion of an image, and wherein each candidate training sample includes a plurality of patches of the portion of the image; for each candidate training sample in the group of candidate training samples: for each patch of the plurality of patches associated with the candidate training sample, determining a plurality of probabilities, each probability being a probability that the patch corresponds to a label of a plurality of labels, wherein the plurality of probabilities are determined using the trained CNN; identifying a subset of the patches in the plurality of patches; and for each patch in the subset of the patches, calculating a metric that indicates at least a variance of the probabilities assigned to each patch in the subset of the patches; selecting a subset of the candidate training samples from the group of candidate training samples based on the metric, wherein the subset does not include all of the candidate training samples; labeling candidate training samples in the subset of the candidate training samples by querying an external source; and re-training the CNN using the labeled candidate training samples.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 2 shows another example of a process for selecting candidate for annotation for use in training classifiers in accordance with some embodiments of the disclosed subject matter.

FIG. 6 shows examples of different patterns of predictions for patches associated with a candidate sample in accordance with some embodiments of the disclosed subject matter.

DETAILED DESCRIPTION

Figure 1:
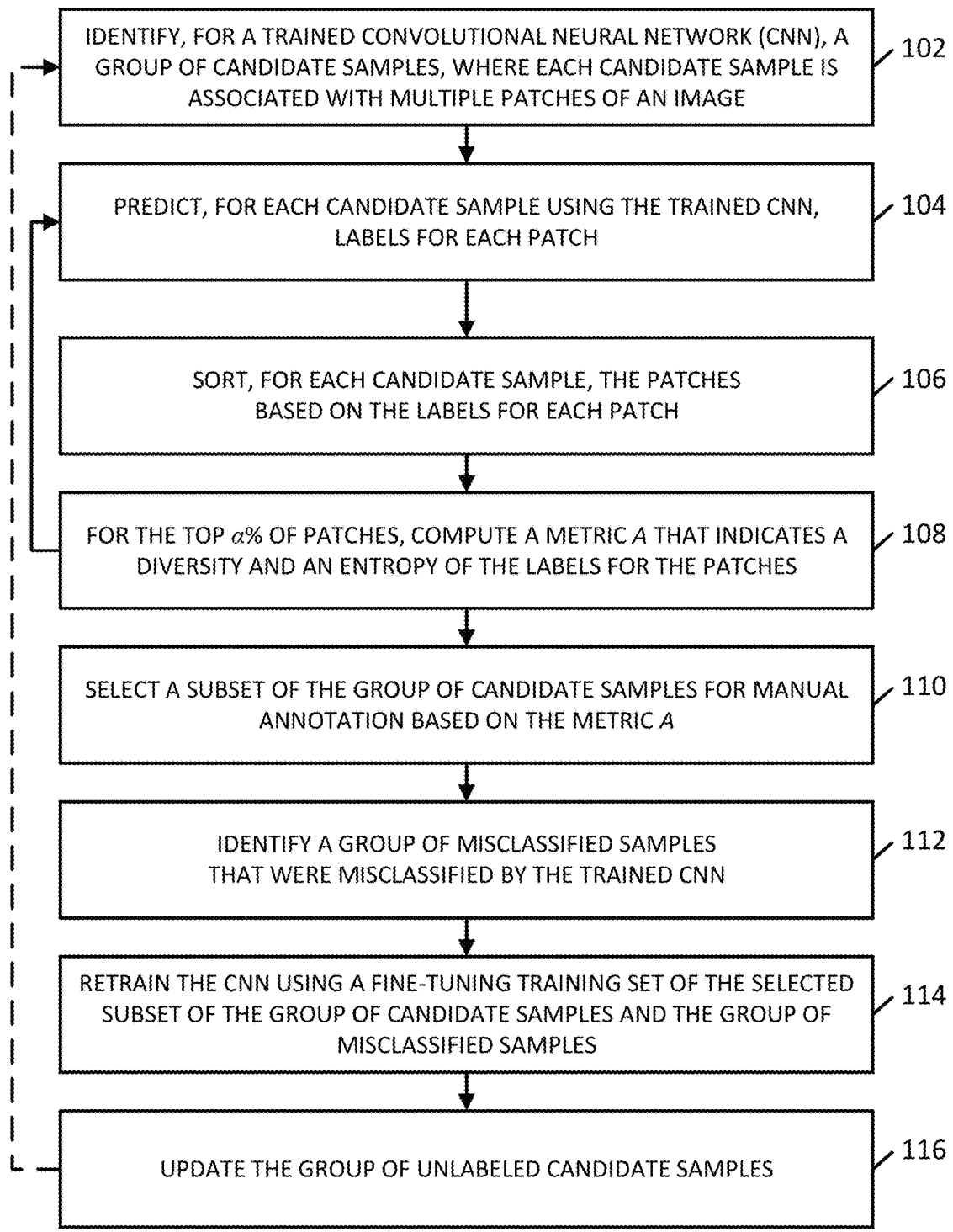
FIG. 1 shows an example of a process for selecting candidates for annotation for use in training classifiers in accordance with some embodiments of the disclosed subject matter.

In accordance with various embodiments, mechanisms (which can include methods, systems, and media) for selecting candidates for annotation for use in training classifiers are provided.

In some embodiments, the mechanisms described herein can identify candidate samples to fine-tune training, or boost performance, of a Convolutional Neural Network (CNN). In some embodiments, the mechanisms described herein can begin with a pre-trained CNN and can use the techniques described herein to identify particularly salient samples that have not yet been annotated. The mechanisms can then transmit identified salient samples for manual annotation (e.g., by a qualified human annotator), and can use the manually annotated samples to update training of the CNN.

In some embodiments, the mechanisms described herein can identify salient candidate samples for manual annotation using any suitable technique or combination of techniques. For example, in some embodiments, the mechanisms can generate multiple patches for a particular candidate sample (e.g., generate multiple image patches by cropping, scaling, etc. portions of a candidate sample image). Note that patches generated from the same candidate image are expected to have similar predicted labels by a pre-trained CNN. Therefore, the entropy and diversity of the predictions for the patches, where entropy indicates a classification uncertainty and where diversity indicates a prediction consistency, can be used to determine a "power" of a candidate associated with the patches for improving the performance of the currently trained CNN. In some embodiments, the mechanisms can then select candidate samples that are identified as being particularly useful for fine-tuning the training, and can then transmit the identified candidate samples for manual annotation. In some embodiments, as described below in connection with FIG. 1, fine-tuning of training of the CNN can be performed with both the identified candidate samples as well as with samples that have been previously misclassified by the CNN. Note that, as described below in connection with FIG. 1, in some embodiments, the mechanisms can incorporate randomness in selection of the particularly useful candidate samples to strike a balance between exploration and exploitation. Furthermore, combination of selected candidate samples with previously misclassified candidates can prevent catastrophic forgetting.

In some embodiments, the mechanisms described herein can provide many advantages for training of a CNN. For example, in some embodiments, the mechanisms can use an empty labeled dataset, and do not require seed-labeled candidates. As another example, in some embodiments, the mechanisms described herein can improve a classifier through continuous fine-tuning rather than through repeated re-training of the classifier. As yet another example, in some embodiments, the mechanisms can be used to select candidate samples that are likely to be the most informative by naturally exploiting consistency among patches associated with a candidate sample. As still another example, in some embodiments, the mechanisms can compute selection criteria locally on a small number of patches associated with a candidate sample, thereby saving considerable computation time. As still another example, in some embodiments, the mechanisms can handle noisy labels via majority selection. As still another example, in some embodiments, the mechanisms can autonomously balance training samples among different classes. As still another example, in some embodiments, by incorporating fine-tuning training using hard samples (e.g., previously misclassified samples), the mechanisms can prevent catastrophic forgetting. As still another example, in some embodiments, the mechanisms can balance exploration and exploitation by incorporating randomness into active selection.

Note that, in some embodiments, a CNN can be used to classify samples related to any suitable topic or genre, such as Computer Aided Diagnoses (CAD), and/or any other suitable type of genre. For example, in some embodiments, the mechanisms described herein can be particularly useful for CAD using biomedical images (e.g., MRI images, CT images, images captured from a camera during a medical procedure, and/or any other suitable type of biomedical images). As a more particular example, because current regulations require that CAD systems be deployed in a "closed" environment in which all CAD results are reviewed, and errors, if any, must be corrected by radiologists, the continuous, fine-tuning techniques described herein can be used for substantial improvement of CAD systems.

Turning to FIG. 1, an example 100 of a process for selecting candidates for annotation for use in training classifiers is shown in accordance with some embodiments of the disclosed subject matter. In some embodiments, blocks of process 100 can be executed on any suitable device, such as a server, a desktop computer, a laptop computer, and/or any other suitable type of device. Note that, in some embodiments, block of process 100 can be executed on multiple devices, for example, in parallel, and/or in any other suitable manner.

Process 100 can begin at 102 by identifying, for a trained CNN, a group of candidate samples, where each candidate sample is associated with multiple patches of an image. In some embodiments, each candidate sample in the group of candidate samples can correspond to any suitable type of content. For example, in some embodiments, each candidate sample can be an image. As a more particular example, in some embodiments, each candidate sample can be a medical image (e.g., an MM image, a CT image, an image captured from a camera used during a medical procedure, and/or any other suitable type of medical image). As another more particular example, in some embodiments, a candidate sample can be a frame from a video captured during a medical procedure. Note that, in some embodiments, each sample in the group of candidate samples can be a sample that has not yet been labeled or annotated. In some embodiments, process 100 can identify the group of candidate samples in any suitable manner. For example, in some embodiments, process 100 can identify the group of candidate samples from any suitable dataset or database. Note that, in some embodiments, as shown in process 200 as shown in FIG. 2, the group of candidate samples can be referred to herein as U, where U has n candidates where $i \in [1, n]$.

In some embodiments, each candidate sample in the group of candidate samples can be associated with a group of patches, where each patch is itself an image. For example, in some embodiments, each candidate sample $C_i$ can have m patches $x_i^j$, where $j \in [1, m]$. Note that, in some embodiments, m can be any suitable number (e.g., five, ten, twenty, one hundred, and/or any other suitable number). Additionally, note that, in some embodiments, each candidate sample $C_i$ can be associated with a different number of patches.

In some embodiments, process 100 can generate the patches associated with each candidate sample in any suitable manner. For example, in some embodiments, the patches can be generated automatically for each candidate sample through data augmentation. In some such embodiments, data augmentation can be performed in any suitable manner, and any suitable amount of data augmentation can be performed in some embodiments. For example, in some embodiments, an image that is a single frame of a colonoscopy video and that has a size of 712 pixels by 480 pixels can be received and used to form a candidate. The whole image can be labeled as informative or non-informative. The image can then be cropped into 21 patches (e.g., images that are 50 pixels by 50 pixels) from the image by translating the image by ten (or any other suitable numbers, such as twenty) percent of a resized bounding box in vertical and horizontal directions. Each resulting patch can be rotated eight times by mirroring and flipping. All 21 patches can then be associated with one candidate sample. Note that, in some embodiments, a factor f (e.g., where factor $f \in \{1.0, 1.2, 1.5\}$) can be used to enlarge a patch (e.g., to realize an augmented data set of the original size, 1.2 times larger, and 1.5 times larger) and then crop it back to the original size. For example, if one patch is sized at 10 pixels by 10 pixels, it can be enlarged by a factor f equal to 1.2 to produce a patch of 12 pixels by 12 pixels, and then the patch can be cropped to the center 10 pixels by 10 pixels as a new patch after data augmentation. Additionally, note that, a manner of performing data augmentation can be based on the application. For example, for colonoscopy frame classification, translation data augmentation can be applied by ten percent of a resized bounding box in vertical and horizontal directions. As another example, for polyp detection, rotation data augmentation can be applied at the center of a polyp location. As still another example, for pulmonary embolism detection, scale plus rotation data augmentation can be applied—e.g., by extracting three different physical sizes, e.g., 10 mm, 15 mm, 20 mm wide, by rotating the longitudinal and cross-sectional vessel planes around the vessel axis.

As described above, in some embodiments, process 100 can receive a pre-trained CNN. In some embodiments, the pre-trained CNN can be referred to herein as $M_0$, and the model at step T can be referred to as $M_T$. In some embodiments, any suitable pre-trained CNN can be used, and the pre-trained CNN can be received from any suitable source. For example, in some embodiments, the pre-trained CNN be a pre-trained AlexNet. As other examples, in some embodiments, VGG, GoogleNet, or the ResNet can be used instead of an AlexNet.

In some embodiments, process 100 can iterate through 104-108 as shown in FIG. 1 for each candidate sample in the group of candidate samples. Note that 104-108 are described below in more detail. Additionally, note that pseudo-code for performing the calculations associated with 104-108 are shown in the for loop shown in lines 3-8 of FIG. 2.

Referring back to FIG. 1, at 104, process 100 can, for a candidate sample in the group of candidate samples and using the trained CNN, predict labels for each patch associated with the candidate sample. In some embodiments, a label assigned to the patch can be any suitable label from a group of labels. For example, in some embodiments, the label can correspond to a classification for the patch. As a more particular example, in an instance in which the CNN is a classifier for classifying aspects of medical images (e.g., whether a particular medical image is an informative medical image or an uninformative medical image, whether a particular image includes healthy tissue or diseased issue, and/or any other suitable aspect), the label can correspond to a classification from a group of classifications. In some embodiments, the label can be any label y from a group of |Y| possible labels. For example, in some embodiments, the group of possible labels can include: {"healthy" and "diseased"}; {"informative" and "uninformative"}; {"true positive" and "false positive"}; and/or any other suitable group of possible labels. In some embodiments, the group of possible labels can include any suitable number of labels (e.g., two, three, five, and/or any other suitable number). An example of pseudo-code for predicting labels for each patch of a candidate sample is shown in line 4 of FIG. 2. Note that, in some embodiments, the trained CNN can assign a probability that a particular patch is associated with each label in the group of labels. For example, in some embodiments, in an instance in which the group of labels includes three labels (e.g., "Label 1," "Label 2," and "Label 3"), process 100 can use the trained CNN to determine probabilities that a particular patch is associated with each of the three labels (e.g., Label 1—0.2, Label 2—0.3, Label 3—0.5, and/or any other suitable probabilities). In some such embodiments, the probabilities associated by the trained CNN, when summed across all of the labels in the group of labels for a particular patch, can be 1 or substantially close to 1. Note that, as shown in FIG. 2, process 100 can predict the labels for each patch using the trained CNN M at step T-1 (referred to as $M_{T-1}$).

Figure 5:
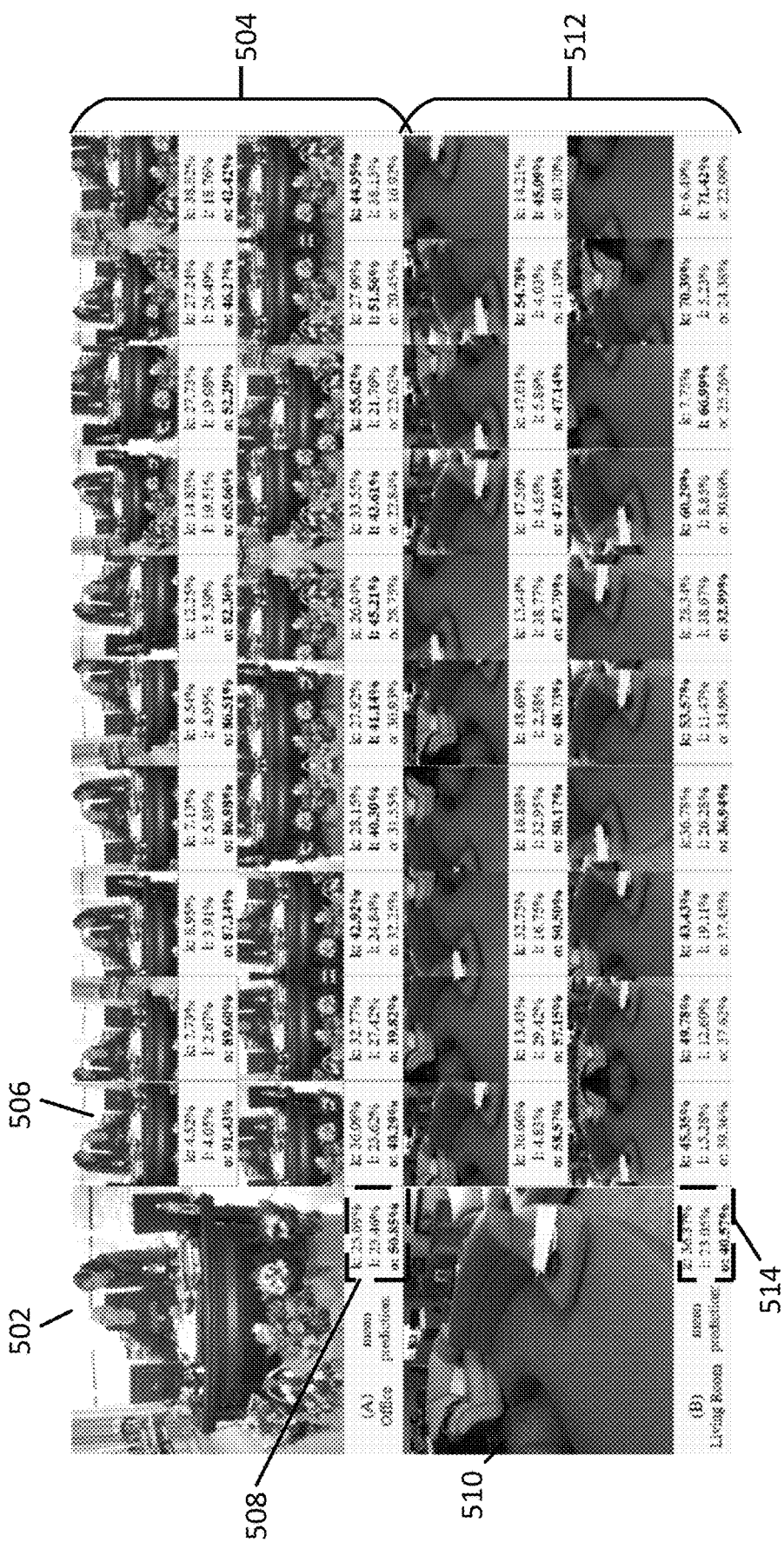
FIG. 5 shows an example of patches associated with a candidate sample sorted based on predicted labels in accordance with some embodiments of the disclosed subject matter

At 106, process 100 can sort the patches associated with the candidate sample based on the labels for each patch. Turning to FIG. 5, an example of patches associated with candidate samples that are sorted based on predicted labels is shown in accordance with some embodiments of the disclosed subject matter.

FIG. 5 shows two examples, 502 and 510 of candidate samples, where candidate sample 502 corresponds to an image of an office, and where candidate sample 510 corresponds to an image of a living room. Group of patches 504 shows twenty patches (e.g., such as individual patch 506) constructed based on candidate sample 502, and group of patches 512 shows twenty patches constructed based on candidate sample 510. As described above in connection with 104, each patch in group of patches 504 and group of patches 512 is assigned a probability that the patch is associated with a particular label in the group of labels. In the example shown in FIG. 5, the group of labels includes labels "k," "l," and "o," which can correspond to, for example "kitchen," "living room," and "office," respectively (e.g., an indication of a location depicted in the corresponding sample). For example, as shown in FIG. 5, patch 506 has been assigned probabilities of: k=4.52%, l=4.05%, and o=91.43%.

In some embodiments, a dominant class or label can be identified based on the assigned probabilities for each patch in a group of patches associated with the candidate sample. In some embodiments, the dominant class or label can be identified in any suitable manner, for example, based on the mean probabilities associated with each label in the group of labels for each patch in the group of patches. For example, for candidate sample 502 shown in FIG. 5, a dominant class or label of "o" (e.g., corresponding to "office") can be identified, because the mean percentages 508 for the labels is highest for label "o," as shown in FIG. 5. As another example, for candidate sample 510 shown in FIG. 5, a dominant class or label of "o" (e.g., corresponding to "office") can be identified, because the mean percentages 514 for the labels is highest for label "o," as shown in FIG. 5. Note that, FIG. 5 shows the patches in each of the group of patches (e.g., patches in group of patches 504 and patches in group of patches 512) sorted based on the probabilities assigned to the identified dominant class or label. For example, patches within group of patches 504 are sorted in a descending order based on the probability assigned, for each patch in group of patches 504, to label "o."

An example of pseudo-code for sorting the patches associated with the candidate sample based on the labels for each patch is shown in line 5 of FIG. 2. For example, as shown in FIG. 2, $C_i$, can be sorted in descending order according to the predicted dominant class, where the predicted dominant class is $\hat{y}$, and where $\hat{y}$ is defined as:

$$\hat{y}_i = \underset{y \in y}{\operatorname{argmax}} \frac{1}{m} \sum_{j=1}^{m} P_i^{j,y}.$$

Referring back to FIG. 1, process 100 can, at 108, for the top α % of patches, compute a metric A that indicates a diversity and an entropy of the labels for the patches. In some embodiments, α can be any suitable percentage, such as 25%, 30%, and/or any other suitable percentage.

In some embodiments, A can be computed in any suitable manner. For example, in some embodiments, process 100 can compute, for the candidate sample, an entropy metric $e_i$ and a diversity metric $d_i$ and can compute A as a combination of $e_i$ and $d_i$. An example of an equation that can be used to calculate $e_i$ is:

$$e_i = -\frac{1}{m} \sum_{k=1}^{|y|} \sum_{j=1}^{m} p_i^{j,k} \log p_i^{j,k}.$$

In some embodiments, an example of an equation that can be used to calculate $d_i$ is:

$$d_i = \sum_{k=1}^{|y|} \sum_{j=1}^{m} \sum_{t=j}^{m} (p_i^{j,k} - p_i^{t,k}) \log \frac{p_i^{j,k}}{p_i^{t,k}},$$

where k is an index that iterates over the labels in the group of labels |Y| In some embodiments, A for a candidate sample $C_i$ can then be calculated as:

$$A_i = \lambda_1 e_i + \lambda_2 d_i.$$

In some embodiments, $\lambda_1$ and $\lambda_2$ can correspond to weighting parameters for the entropy metric and the diversity metric, respectively. In some embodiments, $\lambda_1$ and $\lambda_2$ can have any suitable values, including 0. Note that, in some embodiments, $A_i$ can be a score matrix of size αm×αm for each candidate sample $C_i$.

Note that, in some embodiments, the entropy and the diversity calculated for a particular candidate sample can indicate any suitable information. For example, in some embodiments, entropy can indicate a classification certainty, where a higher entropy value indicates a higher uncertainty in the classification of the patches associated with the candidate sample. As another example, in some embodiments, diversity can indicate prediction consistency among the patches associated with the candidate sample, where a higher diversity value indicates a greater degree of prediction inconsistency.

Turning to FIG. 6, an example of prediction patterns for patches associated with a particular candidate sample as well as diversity and entropy metrics are shown in accordance with some embodiments of the disclosed subject matter. In some embodiments, for a prediction $p_i^j$ of a particular patch $x_i^j$ by a current trained version of a CNN (e.g., the model at a current time-step), the prediction pattern of a candidate $C_i$ can be a histogram $P_i = p_i^j$, $j \in [1, m]$. FIG. 6 shows seven examples of histograms for prediction patterns for a candidate $C_i$—patterns A, B, C, D, E, F, and G. In some embodiments, the prediction patterns shown in FIG. 6 can be used to identify a candidate $C_i$ that is particularly useful for fine-tuning training of the CNN. Description of the patterns A-G are given below. Note that entropy and diversity metrics for each pattern are shown in FIG. 6. As illustrated, diversity and entropy are calculated both for all of the patches associated with the candidate sample as well as for the top α patches (indicated as entropy$^\alpha$ and diversity$^\alpha$).

Referring to pattern A of FIG. 6, the histogram is mostly concentrated at 0.5, with a higher degree of uncertainty.

Referring to pattern B of FIG. 6, the histogram of pattern B is flatter than that of pattern A, as the patches' predictions are spread widely from 0 to 1 with a higher degree of inconsistency among the patches' predictions. Since all of the patches associated with a particular candidate sample are generated via data augmentation, the patches are expected to generate similar predictions by the CNN, and therefore, the candidate associated with pattern B have the potential to significantly enhance the current CNN's performance.

Referring to pattern C, the histogram is clustered at both ends, with a higher degree of diversity. In some embodiments, candidates associated with this type of histogram pattern are most likely associated with noise labels at the patch level, and are therefore the least favorable for use in active selection because they may cause confusion when fine-tuning the CNN.

Referring to patterns D and E, the histograms are clustered at either end (i.e., 0 or 1), with a higher degree of certainty. In some embodiments, candidates associated with these types of histogram patterns should not be used for manual annotation and fine-tuning, because it is likely that the current CNN has correctly predicted these candidates, and that these candidates would therefore contribute little toward fine-tuning the current CNN.

Referring to patterns F and G, patches have a higher degree of certainty for some of the predictions, but there are some outliers in the predictions. In some embodiments, candidates associated with these types of histogram patterns can be valuable because they are capable of smoothly improving the CNN's performance. In some embodiments, while such candidates might not make dramatic contributions, they do not significantly degrade the CNN's performance either.

Note that, an example of pseudo-code for calculating A for the top a % of patches is shown in lines 6 and 7 of FIG. 2.

Referring back to FIG. 1, in some embodiments, process 100 can loop back to 104 and iterate through 104-108 with another candidate sample from the group of candidate samples. In some embodiments, process 100 can iterate through 104-108 for each candidate sample in the group of candidate samples. Note that, in some embodiments, any suitable optimizer (e.g., Adam, and/or any other suitable optimizer) can be used to solve any of the objective functions described herein.

At 110, process 100 can select a subset of the candidate samples from the group of candidate samples for manual annotation based on the metric A. In some embodiments, the subset can include any suitable number b (e.g., five, ten, twenty, and/or any other suitable number) of the candidate samples from the group of candidate samples. In some embodiments, the subset of the selected candidate samples can be referred to as Q.

In some embodiments, process 100 can select the subset of the candidate samples in any suitable manner. For example, in some embodiments, process 100 can sort the candidate samples in the group of candidate samples (e.g., the $C_i$ in set U) based on the value of A associated with each candidate sample. In some embodiments, process 100 can then use any suitable randomization technique to select b candidates from the sorted group of candidate samples. For example, in some embodiments, process 100 can use a random extension parameter $\omega$ such that b samples are selected from the top $\omega b$ samples in the sorted group of candidate samples. Note that, in some embodiments, $\omega$ can have any suitable value, such as two, five, ten, and/or any other suitable value. A more particular example for selecting b candidates is:

$$A'_i \leftarrow (A'_i - A'_{\omega b})/(A'_1 - A'_{\omega b}),$$

$$A^s_i \leftarrow A'_i \Big/ \sum_i A'_1, \forall i \in [1, \omega b],$$

where $A'_i$ is a sorted list of $A_i$ in descending order of A, and where $A^s_i$ is the sampling probability.

In some embodiments, process 100 can determine or identify manually annotated labels for each of the b samples in set Q in any suitable manner. For example, in some embodiments, process 100 can transmit information associated with each of the selected candidate samples in Q (e.g., an image that corresponds to the candidate sample, and/or any other suitable information) to a user device associated with a qualified annotater, and can receive a classification for each sample in Q from the user device associated with the qualified annotater. In some embodiments, process 100 can then associate the manually-annotated classification with each of the selected candidate samples in Q such that each sample in Q is then labeled with a correct classification.

Note that, an example of pseudo-code for selecting the subset of the candidate samples and assigning manually annotated labels to candidate samples for the subset of the candidate samples is shown in lines 9-11 of FIG. 2.

Referring back to FIG. 1, at 112, process 100 can identify a group of misclassified samples that were misclassified by the trained CNN. Note that, in some embodiments, process 100 can identify samples that were misclassified by the trained CNN at step T−1. In some embodiments, the group of misclassified samples can be training samples from a labeled training set L that were associated with ground-truth classifications and that were misclassified by the trained CNN at step T−1. In some embodiments, the group of misclassified samples can be referred to as set H. Note that, in some embodiments, the misclassified samples can be referred to as "hard" samples.

Note that, an example of pseudo-code for identifying the group of misclassified samples is shown in lines 12-13 of FIG. 2.

Referring back to FIG. 1, at 114, process 100 can re-train the CNN using both the selected candidate samples (that is, set Q) and the identified group of misclassified samples (that is, set H). More particularly, in some embodiments, process 100 can re-train the CNN with the union of H and Q. In some embodiments, re-training the CNN using H and Q can generate an updated model, that is, the model at step T (e.g., $M_T$). Note that, in some embodiments, re-training the CNN using the selected candidate samples and the misclassified samples can be referred to as fine-tuning the CNN.

Note that, an example of pseudo-code for re-training the CNN is shown in line 14 of FIG. 2.

Referring back to FIG. 1, at 116, process 100 can update the group of unlabeled training samples U. For example, in some embodiments, process 100 can remove the selected candidate samples Q from set U. Note that, in some embodiments, process 100 can additionally update the group of labeled samples L to include the selected candidate samples Q (e.g., with the manual annotations associated with each sample in Q).

Note that, an example of pseudo-code for updating the unlabeled and labeled samples is shown in line 15 of FIG. 2.

Referring back to FIG. 1, in some embodiments, process 100 can loop back to 102 and select a new group of candidate samples. In some embodiments, process 100 can iterate through the blocks of process 100 until any suitable classification performance is satisfied. In some embodiments, any suitable criteria can be used to determine if classification performance is satisfactory. For example, in some embodiments, the criteria can include whether more than a predetermined percentage of newly annotated samples are correctly predicted by the model at a current time-step (e.g., more than 70%, more than 80%, and/or any other suitable percentage).

Figure 3:
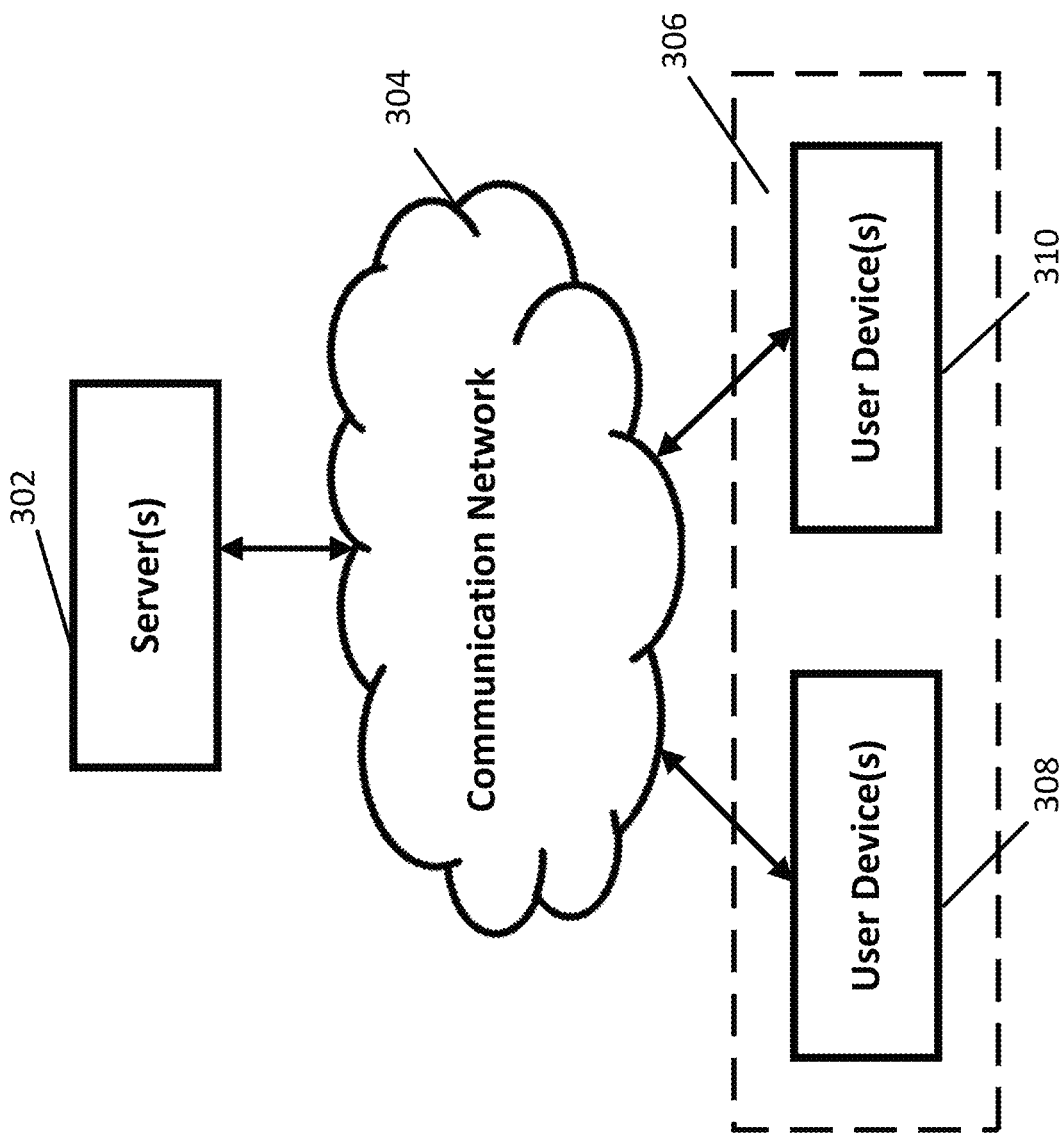
FIG. 3 shows a schematic diagram of an illustrative system suitable for implementation of mechanisms described herein for selecting candidates for annotation for use in training classifiers in accordance with some embodiments of the disclosed subject matter.

Turning to FIG. 3, an example 300 of hardware for selecting candidates for annotation for use in training classifiers that can be used in accordance with some embodiments of the disclosed subject matter is shown. As illustrated, hardware 300 can include a server 302, a communication network 304, and/or one or more user devices 306, such as user devices 308 and/or 310.

Server 302 can be any suitable server(s) for storing information, datasets, programs, and/or any other suitable type of content. For example, in some embodiments, server 302 can store any suitable datasets used for training, validating, or testing a classifier. In some embodiments, server 302 can transmit any portion of any suitable dataset to user devices 306, for example, in response to a request from user devices 306. Note that, in some embodiments, server 302 can execute any suitable programs or algorithms for selecting candidates for annotation for use in training classifiers. For example, in some embodiments, server 302 can execute any of the blocks shown in and described above in connection with FIG. 1 for selecting candidates for annotation for use in training classifiers. In some such embodiments, server 302 can receive any suitable data or parameters associated with an algorithm for selecting candidates, as described above in connection with FIGS. 1 and 2. In some embodiments, server 302 can be omitted.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links to communication network 304 that can be linked via one or more communications links to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices. In some embodiments, user devices 306 can perform any suitable function(s). For example, in some embodiments, user devices 306 can execute any suitable blocks shown in and described above in connection with FIGS. 1 and 2 for selecting candidates for annotation for training classifiers. As another example, in some embodiments, user devices 306 can initiate execution of any suitable blocks of processes 100 or 200 on server 302, for example, by transmitting instructions to server 302 in connection with any suitable parameters for selecting candidates for annotation for training classifiers. In some embodiments, user devices 306 can include any suitable types of user devices, such as a desktop computer, a laptop computer, a mobile phone, a tablet computer, and/or any other suitable type of user device.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Figure 4:
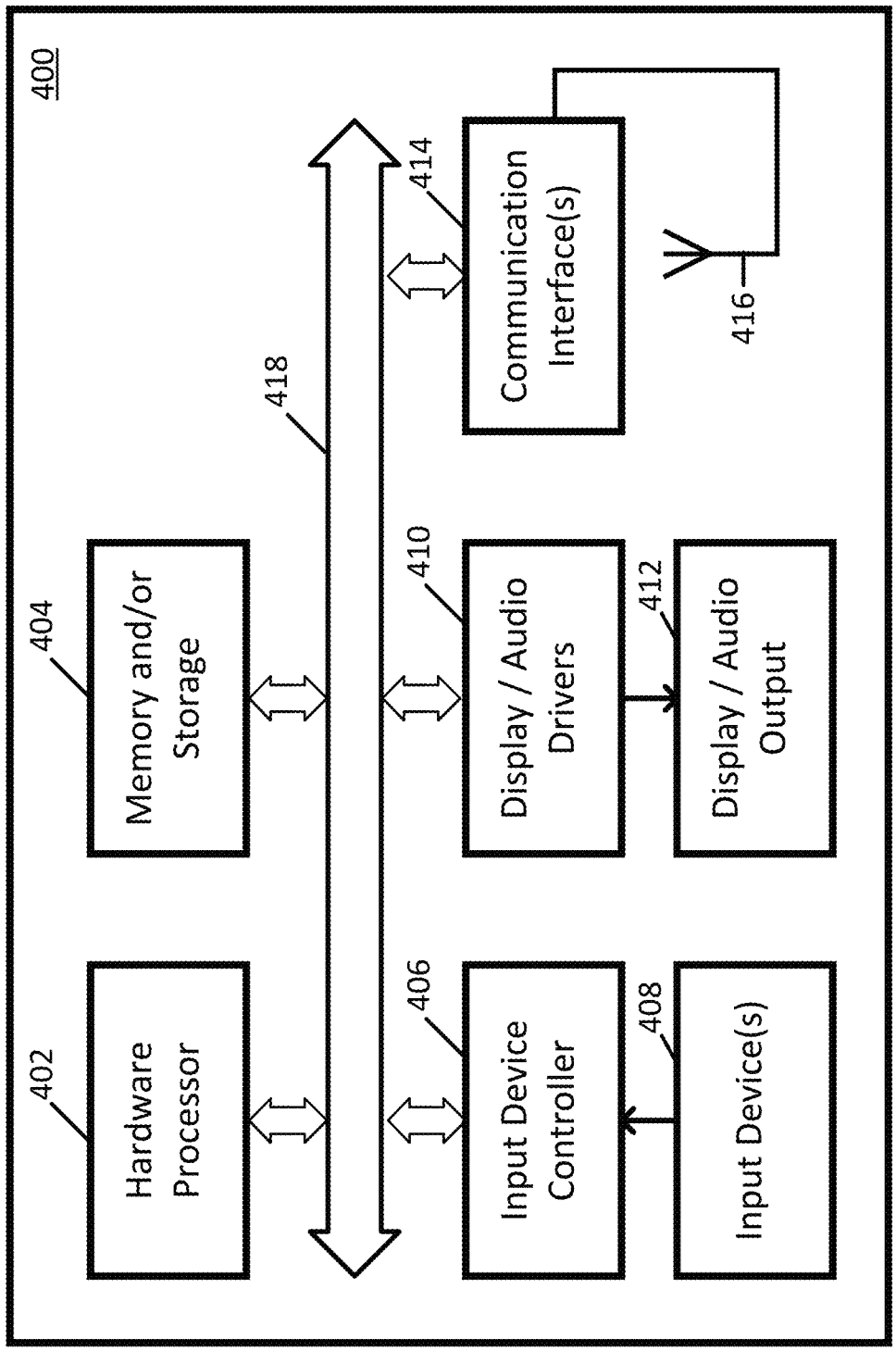
FIG. 4 shows a detailed example of hardware that can be used in a server and/or a user device of FIG. 3 in accordance with some embodiments of the disclosed subject matter.

Server 302 and user devices 306 can be implemented using any suitable hardware in some embodiments. For example, in some embodiments, devices 302 and 306 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a server program stored in memory and/or storage of a server, such as server 302. In some embodiments, hardware processor 402 can be controlled by a computer program stored in memory and/or storage 404 of user device 306.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for selecting candidates for annotation for use in training classifiers are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for selecting candidates for annotation for use in training classifiers, comprising:
identifying, for a trained Convolutional Neural Network (CNN), a group of candidate training samples, wherein each candidate training sample is a portion of an image, and wherein each candidate training sample includes a plurality of patches of the portion of the image;
for each candidate training sample in the group of candidate training samples:
for each patch of the plurality of patches associated with the candidate training sample, determining a plurality of probabilities, each probability being a probability that the patch corresponds to a label of a plurality of labels, wherein the plurality of probabilities are determined using the trained CNN;
identifying a subset of the patches in the plurality of patches; and
for each patch in the subset of the patches, calculating a metric that indicates at least a variance of the probabilities assigned to each patch in the subset of the patches;
selecting a subset of the candidate training samples from the group of candidate training samples by sorting the candidate samples in a descending order based on the metric, wherein the subset does not include all of the candidate training samples, wherein a higher value of the metric indicates that a candidate sample is more informative for training of the CNN, and further wherein the selecting of the subset of the candidate samples is based on the sorted candidate samples;
labeling candidate training samples in the subset of the candidate training samples by querying an external source; and
re-training the CNN using the labeled candidate training samples.

2. The method of claim 1, further comprising identifying a group of misclassified training samples that were misclassified by the trained CNN, wherein the CNN is re-trained using both the labeled candidate training samples and the group of misclassified training samples.

3. The method of claim 1, wherein the metric further indicates an uncertainty of the probabilities assigned to each patch in the subset of patches.

4. The method of claim 1, wherein the subset of the candidate samples are selected using a randomization parameter.

5. The method of claim 1, wherein each patch in the plurality of patches is generated by cropping the portion of the image corresponding to the candidate training sample.

6. A system for selecting candidates for annotation for use in training classifiers, the system comprising:
a memory; and
a hardware processor that, when executing computer-executable instructions stored in the memory, is configured to:
identify, for a trained Convolutional Neural Network (CNN), a group of candidate training samples, wherein each candidate training sample is a portion of an image, and wherein each candidate training sample includes a plurality of patches of the portion of the image;
for each candidate training sample in the group of candidate training samples:
for each patch of the plurality of patches associated with the candidate training sample, determine a plurality of probabilities, each probability being a probability that the patch corresponds to a label of a plurality of labels, wherein the plurality of probabilities are determined using the trained CNN;
identify a subset of the patches in the plurality of patches; and
for each patch in the subset of the patches, calculate a metric that indicates at least a variance of the probabilities assigned to each patch in the subset of the patches;
select a subset of the candidate training samples from the group of candidate training samples by sorting the candidate samples in a descending order based on the metric, wherein the subset does not include all of the candidate training samples, wherein a higher value of the metric indicates that a candidate sample is more informative for training of the CNN, and further wherein the selecting of the subset of the candidate samples is based on the sorted candidate samples;
label candidate training samples in the subset of the candidate training samples by querying an external source; and
re-train the CNN using the labeled candidate training samples.

7. The system of claim 6, wherein the hardware processor is further configured to identify a group of misclassified training samples that were misclassified by the trained CNN, wherein the CNN is re-trained using both the labeled candidate training samples and the group of misclassified training samples.

8. The system of claim 6, wherein the metric further indicates an uncertainty of the probabilities assigned to each patch in the subset of patches.

9. The system of claim 6, wherein the subset of the candidate samples are selected using a randomization parameter.

10. The system of claim 6, wherein each patch in the plurality of patches is generated by cropping the portion of the image corresponding to the candidate training sample.

11. Non-transitory computer-readable storage media having computer executable instructions stored thereupon that, when executed by a processor, the computer executable instructions cause the processor to perform a method for selecting candidates for annotation for use in training classifiers, the method comprising:

identifying, for a trained Convolutional Neural Network (CNN), a group of candidate training samples, wherein each candidate training sample is a portion of an image, and wherein each candidate training sample includes a plurality of patches of the portion of the image;

for each candidate training sample in the group of candidate training samples:

for each patch of the plurality of patches associated with the candidate training sample, determining a plurality of probabilities, each probability being a probability that the patch corresponds to a label of a plurality of labels, wherein the plurality of probabilities are determined using the trained CNN;

identifying a subset of the patches in the plurality of patches; and for each patch in the subset of the patches, calculating a metric that indicates at least a variance of the probabilities assigned to each patch in the subset of the patches;

selecting a subset of the candidate training samples from the group of candidate training samples by sorting the candidate samples in a descending order based on the metric, wherein the subset does not include all of the candidate training samples, wherein a higher value of the metric indicates that a candidate sample is more informative for training of the CNN, and further wherein the selecting of the subset of the candidate samples is based on the sorted candidate samples;

labeling candidate training samples in the subset of the candidate training samples by querying an external source; and re-training the CNN using the labeled candidate training samples.

12. The non-transitory computer-readable media of claim 11, wherein the method further comprises identifying a group of misclassified training samples that were misclassified by the trained CNN, wherein the CNN is re-trained using both the labeled candidate training samples and the group of misclassified training samples.

13. The non-transitory computer-readable media of claim 11, wherein the metric further indicates an uncertainty of the probabilities assigned to each patch in the subset of patches.

14. The non-transitory computer-readable media of claim 11, wherein the subset of the candidate samples are selected using a randomization parameter.

15. The non-transitory computer-readable media of claim 11, wherein each patch in the plurality of patches is generated by cropping the portion of the image corresponding to the candidate training sample.

\* \* \* \* \*